(12) United States Patent
Nagano et al.

(10) Patent No.: US 6,968,859 B1
(45) Date of Patent: Nov. 29, 2005

(54) ELECTROMAGNETIC OPERATING DEVICE

(75) Inventors: Taku Nagano, Kanagawa (JP); Koichi Ohba, Kanagawa (JP); Yasuyuki Shingu, Kanagawa (JP); Kenichi Hirano, Kanagawa (JP)

(73) Assignee: Yuken Kogyo Kabushiki Kaisha, Fujisawa (JP)

( * ) Notice: Subject to any disclaimer, the term of this patent is extended or adjusted under 35 U.S.C. 154(b) by 0 days.

(21) Appl. No.: 10/416,063

(22) PCT Filed: Nov. 14, 2000

(86) PCT No.: PCT/JP00/08021

§ 371 (c)(1),
(2), (4) Date: Aug. 26, 2003

(87) PCT Pub. No.: WO02/41333

PCT Pub. Date: May 23, 2002

(51) Int. Cl.[7] .................. F16K 31/06; F16K 31/72; H01F 7/18
(52) U.S. Cl. ............. 137/554; 251/129.09; 251/129.1; 251/129.19; 335/268; 361/210
(58) Field of Search ................. 137/554; 251/129.09, 251/129.1, 129.15, 129.19; 335/153, 256, 335/268; 361/210; 403/270–272, 230, 231, 403/232.1, 244, 256

(56) References Cited

U.S. PATENT DOCUMENTS 4,065,096 A * 12/1977 Frantz et al. ............ 251/129.1
4,841,407 A * 6/1989 Baba et al. ................. 361/146
5,422,780 A * 6/1995 Lignar ........................ 361/154
5,899,436 A * 5/1999 Holmes et al. ........ 251/129.15

FOREIGN PATENT DOCUMENTS

JP 60056137 A * 4/1985
JP 61-108110 A 5/1986
JP 63-300503 A 12/1988

* cited by examiner

Primary Examiner—Ramesh Krishnamurthy
(74) Attorney, Agent, or Firm—Frishauf, Holtz, Goodman & Chick, P.C.

(57) ABSTRACT

Disclosed is a solenoid type electromagnetic operating device which needs a relatively large current only for a limited short period at an excitation start initial stage and is adapted to achieve the speeding up at an excitation start stage and an improvement in responsiveness as well as power saving without increasing a power load on each of a drive circuit and power supply. The device is used for exerting a mechanical output on a valve element against a spring force, and comprises a solenoid coil composed of a plurality of split coils mutually electrically independent, an iron core structure including a fixed core, a movable core and a yoke and assembled with the solenoid coil so as to form a magnetic path loop through which magnetic fluxes from the split coils pass in common, an excitation controller for selectively switching/controlling the excitation current to each split coil, and a transmission mechanism for transmitting the mechanical output based on the displacement of the movable core magnetically attracted to the fixed core to the valve element when one or more of the split coils are excited.

16 Claims, 4 Drawing Sheets

ELECTROMAGNETIC OPERATING DEVICE

This application is a U.S. National Phase Application under 35 USC 371 of International Application PCT/JP00/08021 filed Nov. 14, 2000.

TECHNICAL FIELD

The present invention relates to an electromagnetic operating device, and more specifically to an electromechanical transducer comprising a solenoid type electromagnet device particularly suitable for economization of power consumption, the speeding up of the operation thereof or an improvement in responsiveness, for driving and operating a valve element of a solenoid operated valve such as a proportional electromagnetic control valve, etc., by a mechanical output against a spring force preloaded on the valve element.

BACKGROUND ART

As electromagnetic operating devices for various electromagnetic operated valves such as a directional controll valve, a proportional control valve, etc., there are known various types of electromechanical transducers for respectively exerting a mechanical output on a valve element against a spring force. For the electromagnetic operated valves, an electromagnet device using a solenoid coil, generally, an electromagnetic plunger device called a solenoid device has been widely used, and contrivances for economizing power consumption and making size and weight reductions have heretofore been proposed in various ways.

In this type of solenoid device, an iron core structure made principally of a fixed core, a movable core, and a yoke is equipped with a solenoid coil. Magnetic fluxes produced from the excited solenoid coil pass through a magnetic path formed by the iron core structure, so that the movable core forming an air gap in the magnetic path with respect to the fixed core is magnetically attracted to the fixed core. A mechanical output based on the displacement of the movable core at this time is transmitted to the valve element through, for example, a push rod or a coil spring.

Various experiments and studies for speeding up the operation of the electromagnetic operated valve employed for such a solenoid device to thereby improve the responsiveness have heretofore been performed. However, most of them relate to selection of the design specifications of coils small in electrical time constant ($\lambda=L/R$) and the design of coils for providing a correspondence to driving at a relatively high power supply voltage, and it's no exaggeration to say that the design specifications of the present solenoid device fall within a maturation in a sense from this point of view.

In the various electromagnetic operated valves which perform a simple ON/OFF operation of the directional controll valve or the like or a proportional exciting operation as in the proportional control valve, a reduction in the time constant of the solenoid coil with a view to improving responsiveness can be realized by decreasing the number of turns. However, in order to allow this coil to produce the same magnetic attraction force as the original coil, an excitation current must be increased in accordance with an ampere-turn (AT) regular principle. When a solenoid coil having 1,000 turns as the number of turns thereof is taken, it is uniformly constituted by two split coils each having 500 turns corresponding to the number of turns equal to one-half the above number of turns. If these split coils are connected in parallel and operated, then the responsiveness is improved. However, a power supply current supplied to a parallel combined coil needs twice in order to obtain the same attraction force as in the case of the solenoid coil having 1,000 turns corresponding to the original number of turns. A power loss and electromagnetic induction noise in wiring and each coil also increase as well as an increase in power load to be borne by each of a drive circuit and a power supply for the solenoid device. Thus, while the use of the solenoid coil reduced in the number of turns is effective in speeding up the operation and improving the responsiveness, a coil that excessively increases in drive current, has been taken as unrealistic in terms of practical use.

The solenoid device for the ON/OFF-operation such as the directional controll valve or the like in particular needs to supply a relatively large excitation current in order to exert a sufficient magnetic attraction force on the movable core away from the fixed core in an excitation initial state. However, only a relatively low current value for merely holding the movable core in an attracted state is needed after switching of the valve, and wastage of power cannot be ignored when excitation is continuously carried out with the same excitation current. Therefore, there has heretofore been known a contrivance for inserting a resistor into a coil in series to thereby reduce an excitation current when a certain time has elapsed. However, it is also accompanied by a drawback that since power consumed by the resistor is caused to escape as heat, the effect of performing power saving as viewed from the power supply side is not so obtained, and when such a time limit operation is performed through the use of a semiconductor device such as a transistor or the like, a semiconductor device large in power capacity is needed.

DISCLOSURE OF THE INVENTION

A principal object of the present invention is to provide an electromagnetic operating device capable of achieving the speeding up at an excitation start initial stage and an improvement in responsiveness without increasing a power load on each of a drive circuit and a power supply even if a solenoid coil is made up of split coils, as the solenoid type electromagnetic operating device which needs the relatively large current only for the limited short period at the excitation start initial stage as described above. Another object of the present invention is to provide an electromagnetic operating device effectively adaptable to power saving in a similar configuration. To provide an electromagnetic operated valve equipped with these electromagnetic operating devices each used as a valve driving electromechanical transducer is also a further object of the present invention.

According to the present invention, the above objects can be achieved by an electromagnetic operating device which constitutes an electromechanical transducer for exerting a mechanical output on a valve element against a spring force preloaded on the valve element, wherein said device comprises a solenoid coil including a plurality of split coils which are electrically independent from each other, a magnetic or iron core structure including a fixed core, a movable core and a yoke, said core structure being assembled with said solenoid coil in such a way as to form a magnetic path loop through which magnetic fluxes produced from the split coils pass in common, an excitation controller for selectively switching and controlling the excitation to each of the split coils, and a transmission mechanism for transmitting the mechanical output on the basis of the displacement of the movable core magnetically attracted to the fixed core to the valve element when any one or more of the split coils are excited.

In the magnetic operating device according to the present invention, magnetic fluxes pass through the iron core structure in common if any of a plurality of split coils is excited, and a magnetic attraction force which acts on the movable core, can be transmitted to the valve element as a mechanical output. Therefore, for example, the excitation controller is capable of selectively changing the number of split coils excited simultaneously, or switching excitation to split coils different in time constant. Suitably setting the magnitude of an excitation current in each case makes it possible to achieve the speeding up of operation at the start of excitation and an improvement in responsiveness or achieve post-switching power saving. Since, at this time, the operation of reducing a power supply current after the elapse of a period at an excitation start initial stage can be performed by decreasing the number of split coils to be excited or by switching between the split coils to be excited, uselessly consumed power can be also reduced as compared with the case in which a series resistor is inserted. Since a semiconductor switching device performs a shutoff operation after a short-time conduction period even where switching to the excitation coils is done by the semiconductor switching device, the use of a semiconductor switching device large in power loss is not so necessary and hence a normal small-sized terminal box capable of being mounted on a case of a solenoid coil is enough for an electrically-equipped box for storing it.

The electromagnetic operating device according to the present invention is applicable even to both of an ON/OFF operation and a proportional operation. According to a preferable embodiment of the present invention, the split coils are made up of a plurality of layers of split coil layers divided in the thickness direction of a wound layer of a solenoid coil. According to another preferred embodiment of the present invention, the split coils are made up of a plurality of short solenoids disposed adjacently one another in the axial direction of the solenoid coil. Incidentally, coils are wound by one except for it, e.g., a multi-core conductor such as two-core or more conductors electrically isolated from one another, whereby individual split coils may be constituted by the respective core conductors. Further, in the present invention, the split coils may have the same design specifications electrically substantially equal to one another or may include a plurality of split coils different in electrical design specifications from one another. In the case of proportional control, for example, individual split coils are sequentially excited on a time-division basis, and drive energy based on a commutation operation of each split coil is used, whereby the total drive force of the split coils may be maintained as a result. In the case of ON/OFF control, a plurality of split coils are simultaneously parallel-excited to obtain rated thrust at the beginning of excitation, and excitation based on the subsequent retention current is capable of achieving energy saving as split excitation of only the partial number of coils equivalent to the reduced number of ampere turns commensurate with a power level to be retained.

According to one aspect of the present invention, the excitation controller includes a switching circuit for time-division exciting the split coils in order. Thus, the split coils are time-divisionally excited upon a rated operation in particular to obtain rated thrust with relatively low power consumption, thereby making it possible to avoid an increase in a load on a power supply at the occurrence of the rated thrust. In this case, the plurality of split coils may preferably be parallel-excited simultaneously over a limited period at an excitation start initial stage by the excitation controller. Thus, high thrust can be obtained with high responsiveness only for a short time at the excitation start initial stage.

According to another aspect of the present invention, the excitation controller includes a time limit circuit for simultaneously parallel-exciting the plurality of split coils over a limited period at an excitation start initial stage and thereafter substantially shutting off excitation of at least one of the split coils to thereby hold a state of excitation of the remaining split coils. Thus, the time constant of the solenoid coil is effectively reduced upon parallel excitation. Then parallel split coils relatively small in time constant are excited for a period in which a large force at the excitation initial stage is required, when the electromagnetic operating device is used for an electromagnetic valve, for example, to execute changeover operation of the electromagnetic valve at high speed. After the completion of its changeover, the split coils are excited singly or in a series state by a relatively small current for holding the state of the changeover to thereby make it possible to achieve power saving.

In the case where a target is directed to proportional control in particular, the excitation controller is capable of including a current amplifier for producing an excitation current of magnitude corresponding to a current command value externally supplied.

In the electromagnetic operating device for the proportional control operation according to another aspect of the present invention, preferably, the split coils are substantially identical to one another in electrical design specifications, and the excitation controller includes a plurality of semiconductor switching devices for individually switching excitation currents every split coils, a pulse width modulator for periodically switching-driving the semiconductor switching devices under sequential pulse commutation control with phase differences corresponding to the number of the split coils in accordance with a sync signal, and a current amplifier for producing an excitation current of magnitude corresponding to a current command value externally supplied, so that each output pulse width of the pulse width modulator is varied in accordance with the command value by the output of the current amplifier thereby changing an operation time width of each of the semiconductor switching devices in accordance with the output pulse width.

Thus, if the maximum thrust current command value larger than a steady thrust current command value for the proportional control is supplied during the limited period at the excitation start initial stage, the output pulse widths of the pulse width modulator are expanded, so that the operation times of the respective semiconductor switching devices overlap each other and the split coils are parallel-excited simultaneously. Therefore, high responsiveness equivalent the solenoid coil reduced in both coil resistance and the number of turns can be obtained and hence the responsiveness of the electromagnetic operating device is improved at the excitation start initial stage.

When the current command value is lowered to the steady thrust current command value corresponding to the original set value for proportional control after the elapse of the limited period, each output pulse width of the pulse width modulator becomes narrow, so that the overlapping of the operation times of the semiconductor switching devices is less reduced or brought to naught. Thus, if excitation timings of the split coils at this time, i.e., operating cycles and phase differences of the semiconductor switching devices are designed in advance so as to become equivalent to excitation currents flowing into the split coils in order, which are to flow through "an equivalent solenoid coil of a non-split coil configuration" as viewed from the power supply side, the averaging of currents of the whole solenoid and the averaging of power supply currents are achieved so that their current peaks can be maintained equivalently to that in the case of non-split coil configuration. In any case, the responsiveness can be effectively enhanced without increasing a load on each of the coil drive circuit and power supply.

In this case, the excitation controller may further include a synchronous circuit for controlling commutation cycles and phase differences of the pulse width modulator in such a manner that when the current command value corresponds to the maximum thrust current command value at the excitation start initial stage, the overlapping of the operation times of the semiconductor switching devices reach the maximum, and when the current command value corresponds to the steady thrust current command value for proportional control, the overlapping of the operation times of the semiconductor switching devices is substantially avoided.

According to a further aspect of the present invention, the split coils include a first split coil and a second split coil different in electrical design specifications, particularly in coil time constant, from each other.

When the coil time constant of the second split coil is set smaller than that of the first split coil, the solenoid coil may have a feature that a wire diameter of the second split coil is larger than that of the first split coil, or a feature that the number of turns of the second split coil is fewer than that of the first split coil, or both the features. In any case, wound layers of these split coils can be concentrically laminated and, in particular, it is preferable that the wound layer of one of the split coils, which generates higher heat amount than that in the other of the split coils in accordance with the excitation conditions, may be laminated on the outer periphery of the wound layer of the other of the split coils.

In case that the split coils electrically different in design specifications from each other are included, the excitation controller may comprise a current switching circuit for exciting the second split coil with a first current value over the limited period at the excitation start initial stage, thereafter substantially shutting off excitation of the second split coil and starting excitation to the first split coil with a second current value lower than the first current value. Thus, when the electromagnetic operating device is utilized for an electromagnetic valve, for example, the second split coil relatively low in the number of turns and small in time constant is excited by a large current during a period in which a large force at the excitation initial stage is required, to thereby execute changeover of the electromagnetic valve at high speed. After the completion of its changeover, the excitation of the second split coil is shut off and the first split coil is excited with a relatively low current value for holding the state of its changeover, thereby making it possible to achieve power saving without using a resistor which produces needless power consumption.

In addition to the current switching circuit, a current amplifier for producing an excitation current of magnitude corresponding to a current command value externally supplied can further be provided. Thus, even when the electromagnetic operating device is utilized for a proportional electromagnetic control valve, for example, a similar improvement in the responsiveness can be achieved in addition to the proportional operation control.

Preferably, for the purpose of proportional control, the electromagnetic operating device according to the present invention further comprises current detecting means for detecting the magnitude of a load current flowing through the solenoid coil, and a current feedback circuit for returning a part of current value detected by the current detecting means to the current amplifier.

Similarly in the case of the proportional control, the electromagnetic operating device may further comprise a magnetic sensor for detecting the intensity of a magnetic field produced from the solenoid coil, and a magnetic feedback circuit for feeding back a detected output of the magnetic sensor to the current amplifier.

Also, in the case of the proportional control, the electromagnetic operating device may further comprise a displacement sensor for detecting the amount of displacement of the movable core, and a position feedback circuit for feeding back a detected output of the displacement sensor to the current amplifier.

The present invention also provides an electromagnetic operated valve equipped with the above-described electromagnetic operating device according to the present invention. In the electromagnetic operated valve according to the present invention, the mechanical output of the electromagnetic operating device acts on a valve element for controlling fluid pressure/flow rate, for changeover of the flow direction, or for opening/closing of a flow passage, against a spring force preloaded on the valve element, thereby achieving an improvement in the responsiveness of the operation of the valve element and/or power saving.

The above and other features and advantages of the present invention will become more apparent from the following description in conjunction with the accompanying drawings illustrative of preferred embodiments of the invention.

BEST MODE FOR CARRYING OUT THE INVENTION

Figure 1:
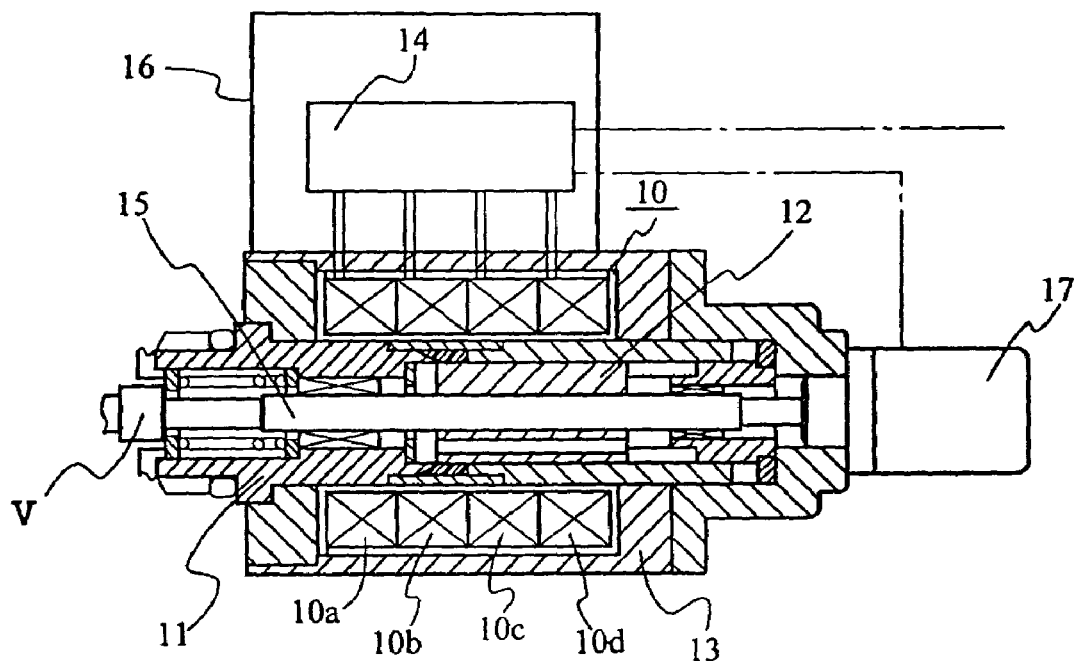
FIG. 1 is an explanatory view showing a schematic configuration of an electromagnetic operating device according to one embodiment of the present invention.

Preferred embodiments of the present invention will be described hereinafter in conjunction with the accompanying drawings. FIG. 1 shows a schematic configuration of an electromagnetic operating device according to the first embodiment of the present invention. This embodiment illustrates a proportionally-operated type wherein a spool type valve element V of a proportional electromagnetic control valve is driven against a spring force preloaded on the valve element by a well-known return spring.

As shown in the figure, the electromagnetic operating device constitutes a proportional solenoid device provided with a solenoid coil 10 comprising a plurality of split coils 10a, 10b, 10c and 10d which are electrically independent of one another, an iron or magnetic core structure comprising a fixed core 11, a movable core 12 and a yoke 13 and assembled with the solenoid coil 10 in such a way as to form a magnetic path loop where magnetic fluxes produced from the split coils pass in common, an excitation controller 14 for selectively switching the application of a current to each split coil and controlling the current value in accordance with externally applied command signals, and a push rod 15 for transmitting a mechanical output based on the displacement of the movable core 12 magnetically attracted to the fixed core 11 to a valve element V when any one or more of the split coils are excited.

The excitation controller 14 can take various circuit configurations and is accommodated or stored within a component box 16 mounted on a case of the solenoid coil 10 in the example illustrated in FIG. 1. Coupled to a tail end of the push rod 15 is a differential transformer-type displacement sensor 17 for detecting the amount of displacement of the movable core 12 or its position and supplying a feedback signal to the excitation controller.

In the present example, the solenoid coil 10 comprises four shorter solenoids or split coils 10a, 10b, 10c and 10d which are adjucently disposed with each other in their solenoid axial directions. In this embodiment, the split coils are identical in electrical design specification since any of the respective split coils is driven under the same energy. For example, when an objective solenoid coil (this non-split equivalent solenoid coil will hereinafter be called "standard coil") having a rated thrust 54 N is to be configured for a rated voltage 24V and a rated coil resistor 10 Ω with the four identical split coils, each of the respective split coils 10a, 10b, 10c and 10d may be formed by a shorter solenoid having a coil resistance of 2.5 Ω. When they are all excited simultaneously in parallel, the combined coil resistance as viewed from the power supply results in 0.625 Ω.

The solenoid coil may be formed by split coils which are split with wound layers, and the number of split coils is not limited to four. When, for example, uniform split formation, i.e., the standard coil of same rating is split into two, a coil resistance of each split coil results in 5 Ω and a parallel combined coil resistance thereof results in 2.5 Ω. Similarly, in the case that the standard coil is split into six, a coil resistance of each split coil results in 1.667 Ω and a parallel combined coil resistance results in 0.278 Ω.

When such split coils are rated-operated, they are all excited in a series connection under the control of the excitation controller 14. When, for example, a current value at the generation of the rated thrust of the standard coil is taken as a reference current, current values flowing through the individual split coils in the series-excited state are equal to the reference current, and a power supply output current remains at the reference current.

On the other hand, the respective split coils are excited in a parallel connection over a limited period subsequent to the start of excitation under the control of the excitation controller 14 at an excitation start initial stage. Current values flowing through the individual split coils at this time are also made equal to the reference current. Accordingly, a power supply current in this case results in one obtained by multiplying the reference current by the number of split coils. By parallel-exciting the split coils at the excitation start initial stage, the time constant of the solenoid coil 10 is temporarily reduced to achieve the speeding up of driving and obtain high responsiveness.

Figure 2:
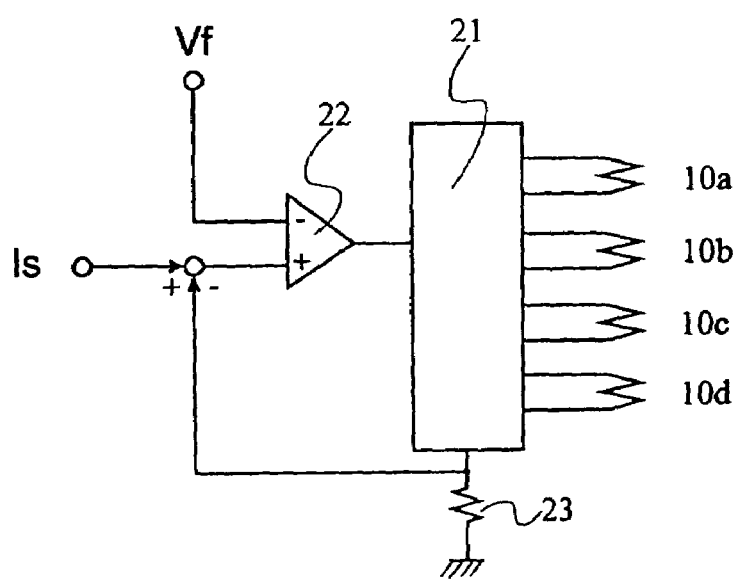
FIG. 2 is a schematic circuit diagram illustrating a configuration example of an excitation controller.

As shown in FIG. 2, the excitation controller 14 in this case includes a parallel/series switching circuit 21 which parallel-excites a plurality of split coils over a limited period at the excitation start initial stage and thereafter series-excites all of the split coils. Thus, all the split coils are series-excited upon the rated operation to acquire rated thrust. Only for a short time at the excitation start initial stage, the plurality of split coils are parallel-excited to make it possible to acquire high thrust at high response and avoid an increase in load on the power supply at the generation of the rated thrust.

Incidentally, the excitation controller 14 shown in FIG. 2 also includes a current amplifier 22 which receives a position feedback signal Vf from the displacement sensor 17 and is responsive to a current command Is for proportional control to produce an excitation current corresponding to the command, and a current detection resistor 23 which detects a load current flowing through each individual split coil and feeds back it to the input of the current amplifier 22 as a negative feedback signal.

A current step response of a solenoid coil is generally expressed in the following equation (1):

$$I=(V/R)(1-exp^{-t/\tau}) \qquad (1)$$

where, I indicates a coil current [A], V a power supply voltage [V], R a coil resistance [W], and L a coil inductance [H]. The coil time constant $\tau$ is expressed in $\tau=L/R$ [sec].

Table 1 shows results obtained by comparing improved effects of responsiveness by parallel-excitation of the split coils every coil-split numbers in contrast between various standard coils of number of turns "t". Incidentally, the term "time" in Table 1 is expressed in the ratio between a rise time required from power-on to attainment to a current value required to produce the rated thrust in the case of each coil split number "N" and a rise time at the standard coil ("N"=1). When the current value is 1A at the standard coil, for example, the term "time" means relative time ratios up to attainment of 2A in the case of the split number "N"=2 and up to attainment of 4A in the case of the split number "N"=4. Also, the term "ratio" indicates a proportion of speeding-up of a response speed achieved by shortening of the rise time.

TABLE 1

| ST. SOL | 1100t - 10Ω | | 1500t - 18Ω | | 1720t - 23Ω | |
|---|---|---|---|---|---|---|
| N | time | ratio | time | ratio | time | ratio |
| 1 | 1 | 1 | 1 | 1 | 1 | 1 |
| 2 | 0.43 | 2.35 | 0.4 | 2.5 | 0.39 | 2.6 |
| 4 | 0.2 | 5.0 | 0.19 | 5.4 | 0.18 | 5.6 |
| 6 | 0.13 | 7.8 | 0.12 | 8.2 | 0.11 | 8.8 |

Figure 3:
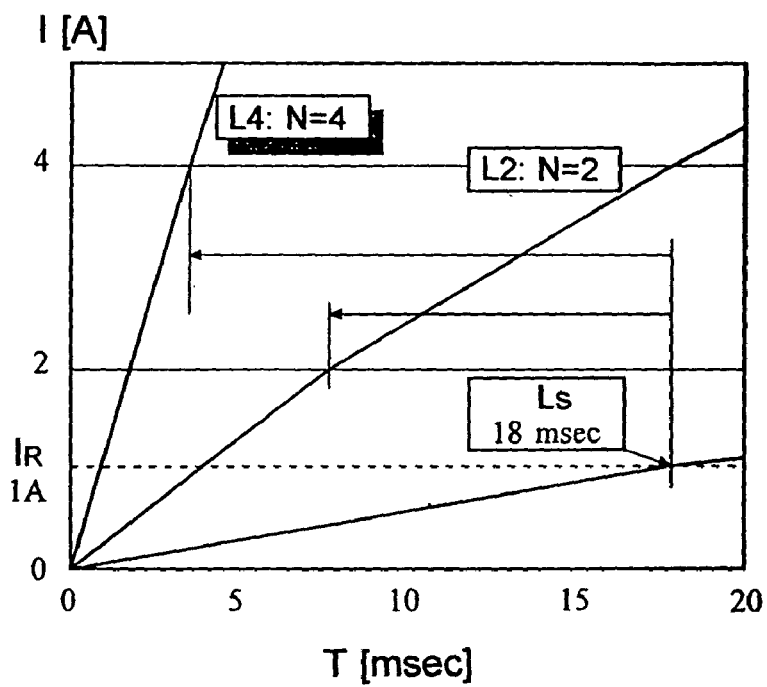
FIG. 3 is a diagram showing current step response characteristics of split coils, wherein ordinate indicates current I [A], and abscissa indicates time T [msec].

FIG. 3 shows results of measurements of current step response characteristics of each split coil and the standard coil at the application of a power supply voltage 24V. The ordinate indicates a load current I [A], and the abscissa indicates an elapsed time T [msec] counted from the application of the voltage. Even in the case of any split numbers, coils made up of a parallel configuration of split coils, and a standard coil are identical in the total number of turns to one another. In the case of a standard coil Ls, the rise time required for the load current to reach a rated current Ir (=1A) is about 18 msec, whereas in the case of a coil L2 (parallel-excitation) at the split number N=2, the rise time required for the load current to reach a reference current value 2A corresponding to the rated current is about 7.7 msec. In the case of a coil L4 (parallel-excitation) at the split number N=4, the rise time required up to a corresponding reference current value 4A is shortened to about 3.6 msec.

Thus, the plurality of split coils are simultaneously parallel-excited within a limited period of the order of less than a slight 10 msec to thereby achieve a high-speed rise and improve responsiveness. After this period, the excitation controller 14 performs switching to series excitation to thereby excite all the split coils in a series connection state. In this state, however, a reference current value of the standard coil, e.g., 1A may be fed through each split coil to produce the rated thrust identical to that of the standard coil. Thus, the load on the power supply is not excessively heavier than upon use of the standard coil. Further, the current values flowing through the individual split coils are identical even during the limited period at the excitation start initial stage and during the rated operation period. Therefore, the current flowing through any one of the split coils of the same characteristic is detected by the current detection resistor 23 upon proportional control to feed back, whereby stable control is enabled.

Figure 4:
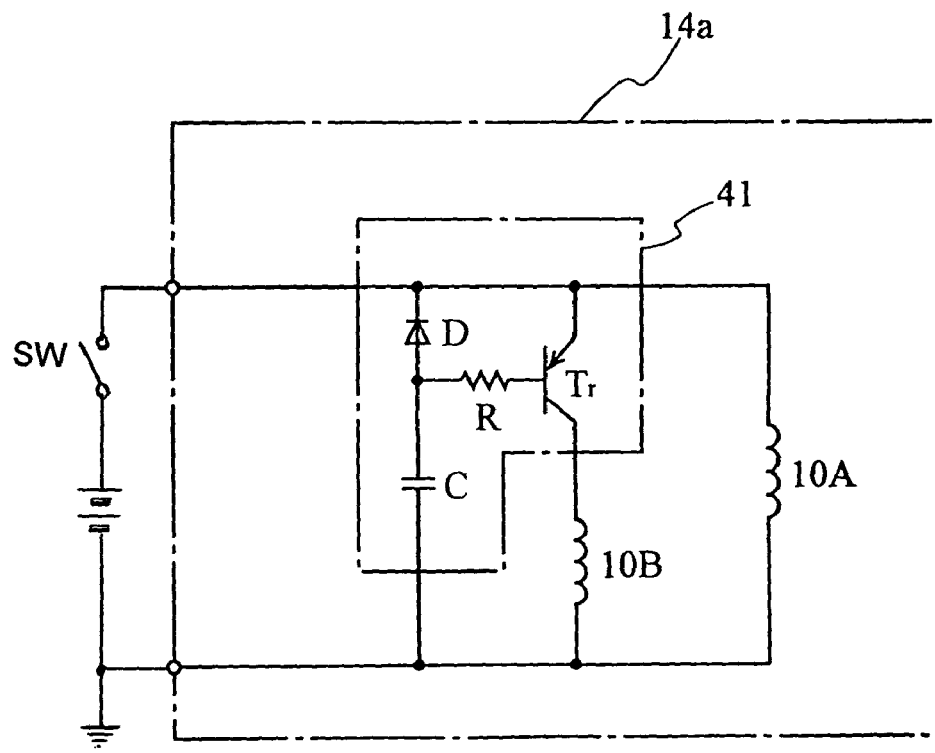
FIG. 4 is a schematic circuit diagram illustrating another configuration example of the excitation controller.

FIG. 4 shows another configuration example of the excitation controller. The number of split coils in this case is N=2. An excitation controller 14a includes a time limit circuit 41 which simultaneously parallel-excites two split coils 10A and 10B over a limited period at the excitation start initial stage and thereafter substantially shuts off the excitation of one split coil 10B thereof to thereby hold the state of excitation of the remaining split coil 10A. The number of split coils may of course be other than two. Also, the number of split coils parallel excited and the number of subsequently shutoff split coils may be suitably selected. The time limit circuit 41 is not limited to a circuit configuration wherein a timer circuit made up of a resistor R and a capacitor C is combined with a switching transistor Tr as shown in FIG. 4, and it is needless to say that it can be modified by various analog or digital circuit technologies.

In FIG. 4, the transistor Tr is a switching transistor which turns on and off a current flowing through the split coil 10B in response to closure of a power switch SW. Since no electrical charge is stored in the capacitor C immediately after power-on, a base-to-emitter voltage is high so that the transistor Tr is brought into conduction to parallel-excite the split coils 10A and 10B simultaneously. With the conduction of the transistor Tr, the capacitor C is charged by its base current. When the potential charged therein rises approximately to the power supply voltage after the elapse of a time interval determined by the RC time constant, the transistor Tr is cut off to substantially shut off the application of a current to the split coil 10B. When the power is shut off, the electrical charge stored in the capacitor C is discharged through a diode D so that the timer circuit is reset to its initial state.

Thus, the two split coils 10A and 10B are parallel-excited only for a short time at the excitation start initial stage to acquire high thrust with high responsiveness. Afterwards, the excitation of one split coil 10B is shut off and thereby the required thrust can be acquired by the excitation of the remaining split coil 10A alone. If, in this case, the electrical design specifications and power characteristics of the respective split coils are selected so as to produce the rated thrust in the parallel-excited state, then a movable core can be driven under sufficient thrust and high-speed initial rise characteristics by both the split coils simultaneously with the excitation start. After the completion of motion of the movable core, a low current equivalent to a load current for one split coil alone can be taken as a retention or hold current for maintaining its state. Thus, the aim of enhancing responsiveness and economizing power consumption can be achieved.

Incidentally, the manner of the excitation controller 14a shown in FIG. 4 can be used not only for an ON/OFF operation but also for a proportional operation. In a manner similar to FIG. 2 in such a case, the controller may include a current amplifier responsive to a current command for proportional control to thereby produce an excitation current corresponding to the command, and current detecting means for detecting a load current flowing through the split coil 10A as needed and thereby feeding back it to the input of the current amplifier as negative feedback signal. Assuming that in this case, coil specifications are selected so as to produce the rated thrust by excitation of one split coil 10A alone and set as power capacity adaptable to a relatively large instantaneous current at the excitation start initial stage, the speeding up of a rise can be also achieved.

Figure 5:
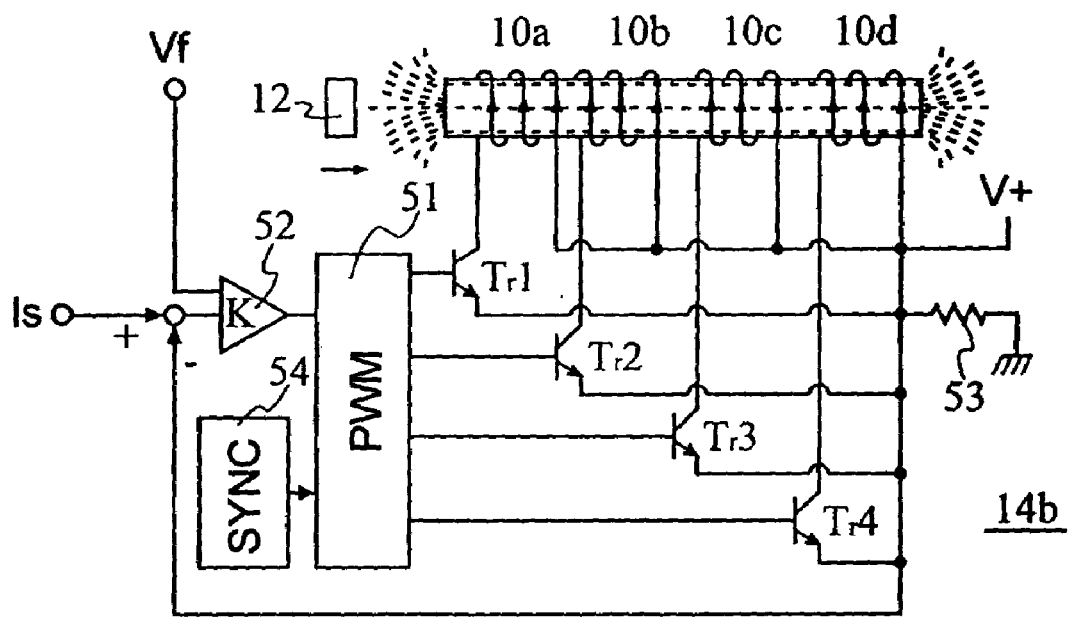
FIG. 5 is a schematic circuit diagram showing a further configuration example of the excitation controller.

FIG. 5 shows a further embodiment of the excitation controller. In the present embodiment, split coils are such four uniformly-divided split coils 10a, 10b, 10c and 10b as shown in FIG. 1. The excitation controller 14b is one used for a proportional operation. Incidentally, DC power is supplied to a terminal V+ from a drive power supply not shown.

Namely, the excitation controller 14b shown in FIG. 5 includes a plurality of switching transistors Tr1, Tr2, Tr3 and Tr4 for individually switching excitation currents for respective split coils, a pulse width modulator (PWM) 51 for periodically switching-driving the switching transistors under sequential pulse commutation control with phase differences corresponding to the number of split coils in accordance with a sync signal supplied from a synchronous circuit (SYNC) 54, a current amplifier 52 adapted to receive a position feedback signal Vf from a displacement sensor 17 and producing an excitation current corresponding to a current command Is externally supplied, and a current detection resistor 53 for detecting a load current flowing through the solenoid coil and feeding back it to the input of the current amplifier 52 as a negative feedback signal. Each PWM output pulse width of the modulator 51 is varied by the output from the current amplifier 52 in accordance with the value of the current command, and an operation time period of each switching transistor is controlled according to the output pulse width.

Incidentally, the synchronous circuit 54 controls commutation cycles and phase differences of the modulator 51 in such a manner that when the current command corresponds to a maximum thrust current command value at the excitation start initial stage, the overlapping of the operation times of the respective switching transistors reach the maximum, and when the current command corresponds to a steady thrust current command value for proportional control, the overlapping of the mutual operation times of the respective switching transistors is substantially brought to naught.

Upon the proportional control operation by the excitation controller 14b, a current command corresponding to a desired excitation current change pattern is supplied from, for example, an external programmable controller. Since the number of split coils N=4 in this case, the current command provides instructions for a current value equal to four times, at maximum, one at the generation of the steady maximum thrust over a limited period at the excitation start initial stage, and thereafter gives instructions for a reduction to a steady thrust generating current value for the proportional control. Also in this case, the excitation controller 14*b* maintains a principle that split coils are simultaneously parallel-excited upon a high-thrust high-speed operation and a combined parallel coil resistance is set to the one-square of the number of split coils to thereby drive the coils, and the current flowing through one split coil is always kept constant without changing ampere turn in order to maintain an attraction force.

Figure 6:
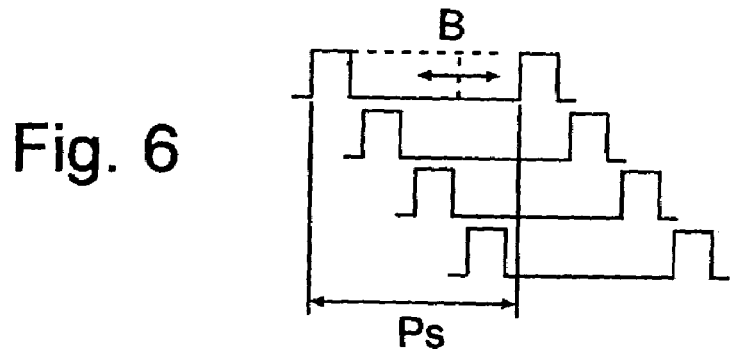
FIG. 6 is a time-based PWM pulse waveform diagram for describing the operation of a pulse width modulator.

As shown in FIG. 6, the pulse width modulator 51 produces four-phase PWM output pulses synchronized with phase differences set by 90 degrees ($\pi/2$ rad) according to the number of split coils N=4 and switching-controls the respective switching transistors Tr1, Tr2, Tr3 and Tr4 based on the output pulses. A unit cycle of the PWM output pulse set for each phase is expressed in Ps in FIG. 6. An output pulse width of each phase is modulated according to the current command. As shown by arrow B in the figure, when the current command is of a large current, the pulse width becomes wide, whereas when the current command becomes a small current, the pulse width becomes narrow. If the current command is of the maximum current, the pulse widths of the pulse outputs for the respective phases are respectively equal to the cycle, so each pulse output results in a 100% pulse width, and accordingly, all the transistors are simultaneously brought into conduction in this condition so that the split coils 10*a*, 10*b*, 10*c* and 10*d* are simultaneously parallel-excited. During the limited period at the excitation start initial stage, the current command for such a large current is transiently given and thereby the load current as viewed from the power supply results in the sum of currents flowing through the respective split coils. Nevertheless, owing to the formation of the parallel combined coil, the enhancement of response at startup can be achieved.

Figure 7:
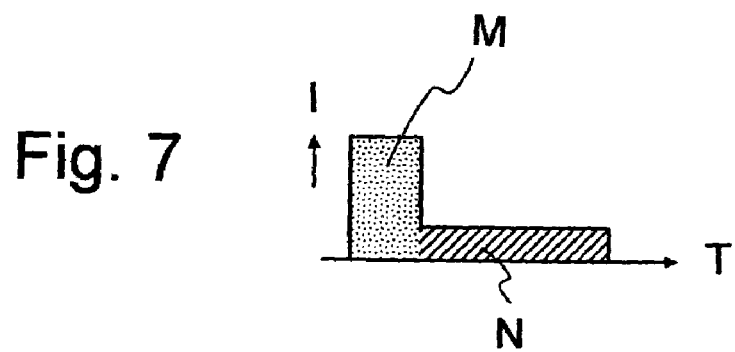
FIG. 7 is an explanatory view typically showing a change in current flowing in each split coil switching-controlled by a PWM output pulse.

When the current command is reduced to the current value for the steady thrust generation, the respective split coils are time-division excited in the four-phase cycles by the PWM output pulses from the modulator 51, so that an average source or power supply current is suppressed to the current value for the rated thrust generation. This manner is typically shown in FIG. 7. As shown in FIG. 7, the device generates instantaneous maximum thrust by a relatively large current during a period M. During a period N subsequent thereto, the device produces rated thrust required upon steady time by a relatively low current.

Incidentally, it is preferable that in the respective embodiments of the proportional control described above, a magnetic sensor, such as, for example, a hole element, is disposed within a fixed core 11 to detect the intensity of a magnetic field produced from the solenoid coil, and the detected intensity is fed back to the input of the current amplifier in the excitation controller to thereby obtain stable excitation control.

Figure 8:
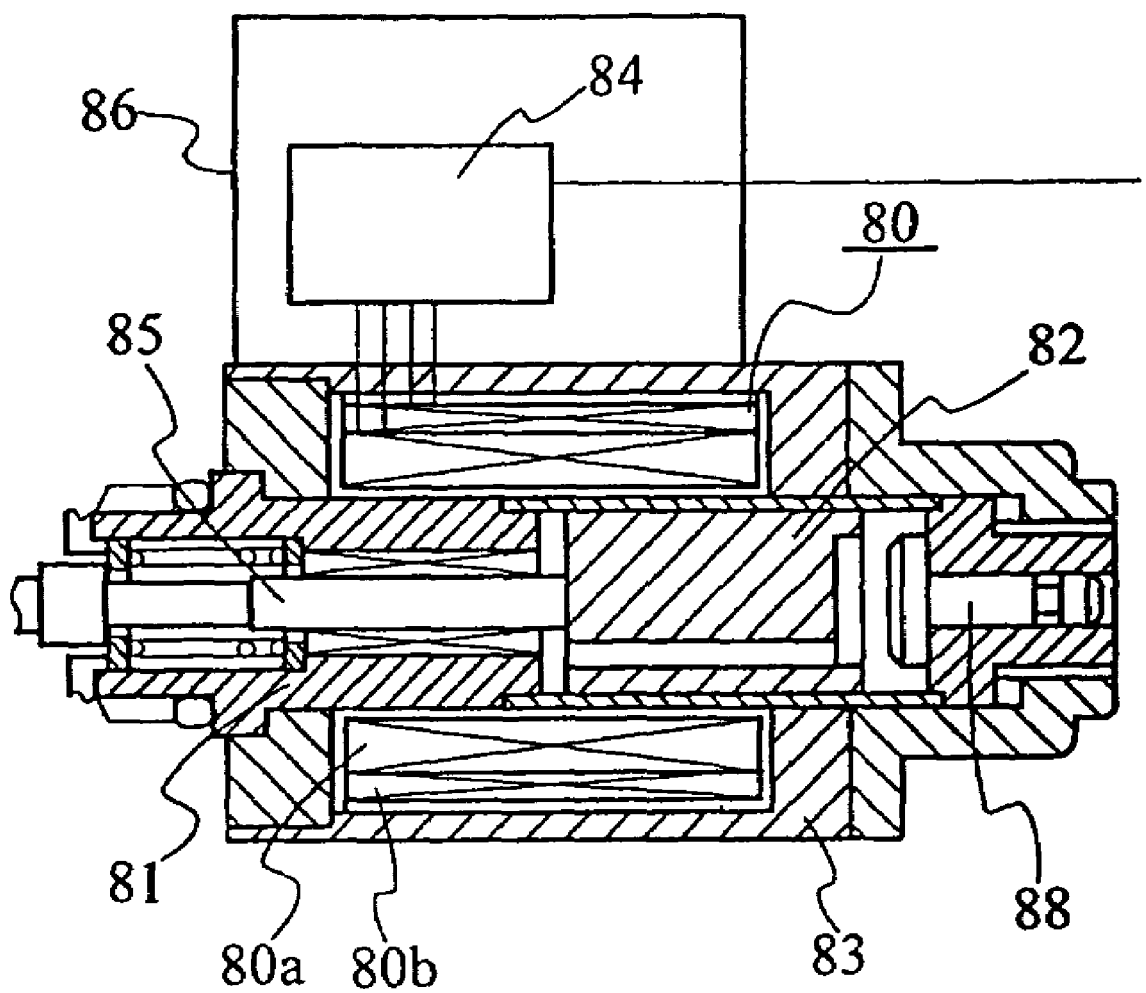
FIG. 8 is an explanatory view showing a schematic configuration of an electromagnetic operating device according to another embodiment of the present invention.

FIG. 8 shows a schematic configuration of an electromagnetic operating device according to another embodiment of the present invention. The present embodiment provides an ON/OFF operation type device in which a valve element V of an electromagnetic valve is driven against a spring force preloaded on the valve element by a return spring.

As shown in FIG. 8, the electromagnetic operating device includes a solenoid coil 80 which is composed of a first split coil 80*a* and a second split coil 80*b* electrically independent of one another, an iron core structure comprising a fixed core 81, a movable core 82 and a yoke 83 and assembled with the solenoid coil 80 in such a way as to form a magnetic path loop where magnetic fluxes produced from the split coils commonly pass, an excitation controller 84 for selectively switching and controlling the application of a current to each split coil, and a push rod 85 for transmitting a mechanical output based on the displacement of the movable core 82 magnetically attracted to the fixed core 81 to a valve element V when any one or more of the split coils are excited.

The excitation controller 84 can take various circuit configurations and is accommodated within a component box 86 mounted on a case of the solenoid coil 80 in the embodiment shown in FIG. 8. A pin 88 for manually operating the movable core 82 is disposed on the tail end of the push rod 85.

In the present embodiment, the split coils 80*a* and 80*b* form coil layers corresponding to two layers divided in the thickness direction of a wound layer. The second split coil 80*b* is thicker than the first split coil 80*a* in diameter of winding. Further, the number of turns of the second split coil 80*b* is also fewer than that of the first split coil 80*a*. Accordingly, the second split coil 80*b* is smaller than the first split coil 80*a* in coil time constant. Namely, the second split coil 80*b* is a coil which allows a relatively large current to flow over a limited period at an excitation start initial stage, and the wound layer thereof is laminated on the outer periphery of the first split coil 80*a* taking account of heat generation under large current. It is needless to say that even if either split coil is placed on the outer side, a similar function can be obtained except for heat sink design.

As to the configuration of the excitation controller 84 in this case, an excitation switching circuit using a time limit circuit 41 similar to one shown in FIG. 4, for example can be employed. Namely, the both first and second split coils 80*a* and 80*b* are parallel-excited only for a short period at the excitation start initial stage to obtain high thrust with high responsiveness. Thereafter, the excitation of second split coil 80*b* is shut off and only the first split coil 80*a* is remained in the excited state to obtain necessary thrust. The second split coil 80*b* is small in time constant and hence the initial responsiveness is much improved.

Incidentally, in the present embodiment, while the first split coil 80*a* is used as a coil for a steady operation and the second split coil 80*b* is used as a coil for a high-speed startup, and they are respectively constituted by split coils one by one, it is needless to say that, for example, a split coil for a high-speed startup may be composed of a plurality of parallel-connected split coils, and a split coil for a steady operation may be composed of a combination of a plurality of split coils different in electrical design specifications from one another.

The above respective embodiments and modifications simply show the typical embodiments of the present invention. It should be understood that extractions of various technical features according to the present invention, which have been disclosed in the individual embodiments, for example, are combined with one another, and any of other modifications obvious by those skilled in the art may fall within the technical scope of the present invention.

In the electromagnetic operating device according to the present invention as described above, magnetic fluxes pass through a magnetic core structure in common even if any of a plurality of split coils is excited, and a magnetic attraction force which acts on a movable core, can be transmitted to a valve element as a mechanical output. Therefore, for example, an excitation controller is capable of selectively changing the number of split coils excited simultaneously, or switching excitation to split coils different in time constant. Suitably setting the magnitude of an excitation current in each case makes it possible to achieve the speeding up of operation at the start of excitation and an improvement in responsiveness or achieve economization of post-switching power consumption. Since, at this time, the operation for reducing a power supply current after the elapse of a period at an excitation start initial stage can be performed by decreasing the number of split coils to be excited or switching between the coils, uselessly consumed power can be also reduced as compared with the case in which a series resistor is inserted. Also, even where switching operation of the excitation to the split coils is performed by means of a semiconductor switching device, the semiconductor switching device performs a cutoff operation after a short-time conduction period, and therefore, there is no need to use a semiconductor switching device large in power loss and hence a normal small-sized terminal box capable of being mounted on a case of a solenoid coil is enough for a component box for housing it.

What is claimed is:

1. An electromagnetic operating device constituting an electromechanical transducer for exerting a mechanical output on a valve element against a spring force preloaded on the valve element, comprising:
   a solenoid coil including a plurality of split coils which are electrically independent from each other;
   a magnetic core structure including a fixed core, a movable core and a yoke, said core structure being assembled with said solenoid coil in such a way as to form a magnetic path loop through which magnetic fluxes produced from the split coils pass in common;
   an excitation controller for selectively switching and controlling the excitation to each of the split coils; and
   a transmission mechanism for transmitting to the valve element the mechanical output on the basis of the displacement of the movable core magnetically attracted to the fixed core when any one or more of the split coils are excited,
   wherein the excitation controller includes a current amplifier for producing an excitation current of magnitude corresponding to a current command value externally supplied.

2. The electromagnetic operating device according to claim 1, wherein the split coils are composed of a plurality of split coil layers divided in the thickness direction of a wound layer of the solenoid coil.

3. The electromagnetic operating device according to claim 1, wherein the split coils are composed of a plurality of short solenoids disposed adjacently to one another in the axial direction of the solenoid coil.

4. The electromagnetic operating device according to claim 1, wherein the split coils have the same design specifications electrically substantially equal to one another.

5. The electromagnetic operating device according to claim 1, wherein the excitation controller includes a switching circuit for time-division exciting the split coils in order.

6. The electromagnetic operating device according to claim 1, wherein the excitation controller includes a time limit circuit for simultaneously parallel-exciting the plurality of split coils over a limited period at an excitation start initial stage and thereafter substantially shutting off excitation of at least one of the split coils to thereby hold a state of excitation of the remaining split coils.

7. The electromagnetic operating device according to claim 1, wherein the excitation controller further comprises current detecting means for detecting the magnitude of a load current flowing through the solenoid coil, and a current feedback circuit for returning a part of current value detected by the current detecting means to the current amplifier.

8. The electromagnetic operating device according to claim 1, further comprising a magnetic sensor for detecting the intensity of a magnetic field produced from the solenoid coil, and a magnetic feedback circuit for feeding back a detected output of the magnetic sensor to the current amplifier.

9. The electromagnetic operating device according to claim 1, further comprising a displacement sensor for detecting the amount of displacement of the movable core, and a position feedback circuit for feeding back a detected output of the displacement sensor to the current amplifier.

10. The electromagnetic operating device according to claim 1, wherein said device is mounted on an electromagnetic operated valve as an electromechanical transducer for exerting a mechanical output on a valve element of said valve against a spring force preloaded on the valve element.

11. An electromagnetic operating device constituting an electromechanical transducer for exerting a mechanical output on a valve element against a spring force preloaded on the valve element, comprising:
    a solenoid coil including a plurality of split coils which are electrically independent from each other;
    a magnetic core structure including a fixed core, a movable core and a yoke, said core structure being assembled with said solenoid coil in such a way as to form a magnetic path loop through which magnetic fluxes produced from the split coils pass in common;
    an excitation controller for selectively switching and controlling the excitation to each of the split coils; and
    a transmission mechanism for transmitting to the valve element the mechanical output on the basis of the displacement of the movable core magnetically attracted to the fixed core when any one or more of the split coils are excited,
    wherein the excitation controller includes a plurality of semiconductor switching devices for individually switching excitation currents of said split coils, a pulse width modulator for periodically switching-driving the semiconductor switching devices under sequential pulse commutation control with phase differences corresponding to the number of the split coils in accordance with a sync signal, and a current amplifier for producing an excitation current of magnitude corresponding to a current command value externally supplied, and wherein each output pulse width of the pulse width modulator is varied in accordance with the command value by the output of the current amplifier thereby changing an operation time width of each of the semiconductor switching devices in accordance with the output pulse width.

12. The electromagnetic operating device according to claim 11, wherein the excitation controller further includes a synchronous circuit for controlling commutation cycles and phase differences of the pulse width modulator in such a manner that when the current command value corresponds to a maximum thrust current command value at the excitation start initial stage, the overlapping of operation times of the semiconductor switching devices reach the maximum, and when the current command value corresponds to a steady thrust current command value for proportional control, the overlapping of the operation times of the semiconductor switching devices is substantially avoided.

13. An electromagnetic device constituting an electromechanical transducer for exerting a mechanical output on a valve element against a spring force preloaded on the valve element, comprising:

a solenoid coil including a plurality of split coils which are electrically independent from each other;

a magnetic core structure including a fixed core, a movable core and a yoke, said core structure being assembled with said solenoid coil in such a way as to form a magnetic path loop through which magnetic fluxes produced from the split coils pass in common;

an excitation controller for selectively switching and controlling the excitation to each of the split coils; and a transmission mechanism for transmitting to the valve element the mechanical output on the basis of the displacement of the movable core magnetically attracted to the fixed core when any one or more of the split coils are excited, wherein the split coils include a first split coil and a second split coil, the coil time constant of the second split coil being smaller than that of the first split coil, and wherein the excitation controller comprises a current switching circuit for exciting the second split coil with a first current value over the limited period at the excitation start initial stage, thereafter substantially shutting off excitation of the second split coil and starting excitation to the first split coil with a second current value lower than the first current value.

14. The electromagnetic operating devices according to claim 13, wherein a wire diameter of the second split coil is thicker than that of the first split coil.

15. The electromagnetic operating device according to claim 14, wherein a wound layer of the second split coil is concentrically laminated on an outer periphery of a wound layer of the first split coil.

16. The electromagnetic operating device according to claim 13, further comprising a current amplifier for producing an excitation current of magnitude corresponding to a current command value externally supplied.

* * * * *